T. M. WESTON.
SOIL PREPARER AND CULTIVATOR.
APPLICATION FILED JAN. 13, 1919.

1,304,838.

Patented May 27, 1919.
2 SHEETS—SHEET 1.

Inventor:
Thomas M. Weston.
By Chas. A. Tillman
Atty

T. M. WESTON.
SOIL PREPARER AND CULTIVATOR.
APPLICATION FILED JAN. 13, 1919.
1,304,838.
Patented May 27, 1919.
2 SHEETS—SHEET 2.
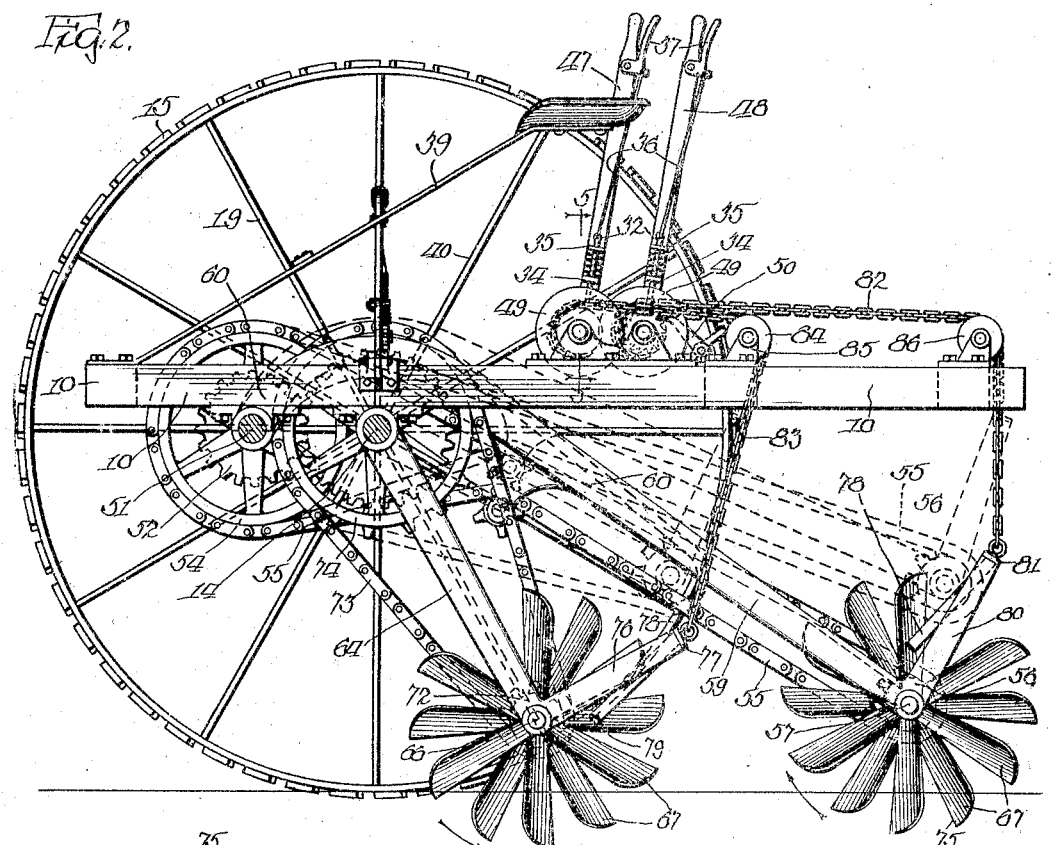
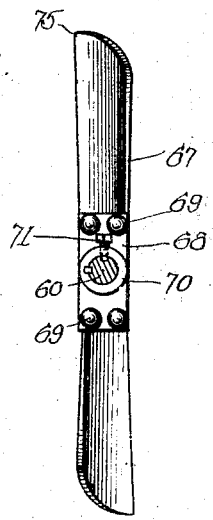
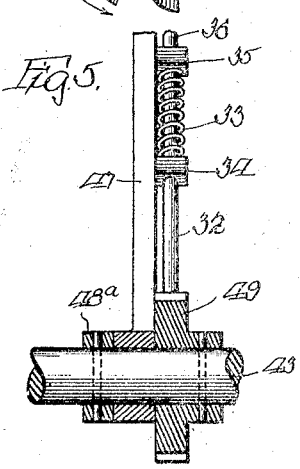
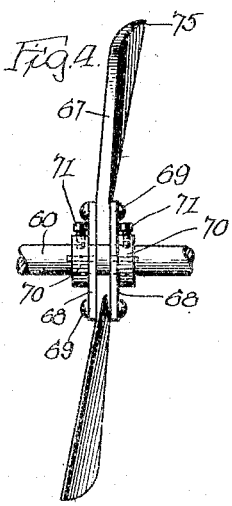
Witness:
Leo J. Dubois
Inventor.
Thomas M. Weston.
By Chas. C. Tillman
Atty

UNITED STATES PATENT OFFICE.

THOMAS M. WESTON, OF CHICAGO, ILLINOIS.

SOIL PREPARER AND CULTIVATOR.

1,304,838.　　　　Specification of Letters Patent.　　Patented May 27, 1919.

Application filed January 13, 1919. Serial No. 270,827.

*To all whom it may concern:*

Be it known that I, THOMAS M. WESTON, a citizen of the United States, residing at the city of Chicago, in the county of Cook and State of Illinois, have invented certain new and useful Improvements in Soil Preparers and Cultivators, of which the following is a specification.

This invention relates to improvements in a machine or apparatus to be used for preparing and pulverizing the ground or soil for seeding and for cultivating crops of certain kinds, and it consists in certain peculiarities of the construction, novel arrangement and operation of the various parts thereof as will be hereinafter more fully set forth and specifically claimed.

As is well known to those skilled in the art to which my invention pertains, it is desirable to "work" or prepare the soil or ground previously to seeding or planting the same, to a considerable depth (at least far enough to allow the plant roots to get below the drought line), by thoroughly cutting-up, stirring and pulverizing it, and that this has heretofore generally been done by first plowing, and subsequently harrowing with disk and tooth harrows. This method manifestly is slow, laborious, expensive and unsatisfactory, as, when a tooth harrow is employed, the roots, weeds and grass, gathered thereby are usually deposited in heaps and are thus prevented the exposure necessary to kill them. The same result occurs when disk harrows are employed, as the roots, grass and weeds are more or less covered and packed down by the dirt thrown by the disks.

The objects of the invention are manifold, and among them is, to provide a soil preparer or worker and a cultivator combined in one machine, which shall be simple and inexpensive in construction, strong, durable and efficient in operation, and with its parts so made and arranged as to be operable by a single operator riding on the machine. Another and very important object is to provide an apparatus of the above named general character in which the primary cutters and secondary cutters or pulverizing members for the soil are given rotary movement and leverage by means of power imparted from the carriage or traction wheels of the machine. A further object is to provide means for breaking up or cutting and pulverizing the earth or soil in one operation of the machine, and in such a manner that the depth of the cutting and pulverizing operation can be readily regulated. Still another object is to provide means for automatically cleaning the rotary cutters and re-cutters or pulverizing members, to the end, that the primary cutters will be freed in their operation from clay or sticky earth, and the re-cutters or pulverizers from roots, grass and weeds, in such a manner that they will be left exposed and subsequently killed by such exposure. A further object is to provide means whereby the primary cutters and the secondary or re-cutting members may be operated in conjunction with one another or independently, and so that sections of the primary cutters can be used in the act of cultivating between rows of plants.

Numerous other objects and advantages of the invention will be disclosed in the following description and explanation of the construction and operation of the machine.

In the accompanying drawings which serve to illustrate an embodiment of the invention—

Fig. 2 is a view in side elevation with one of the traction or carriage wheels removed, illustrating by dotted lines positions to which the cutters and their carriers or frames may be raised and maintained;

Fig. 3 is a face or side view of one of the cutters showing a means of securing it on its rotary shaft;

Fig. 4 is an edge view thereof;

Fig. 5 is a view partly in section and partly in elevation of the lower portion of one of the controlling levers and a part of one of the shafts used for raising and lowering the frames or carriers for the cutters and pulverizers;

Like numerals of reference refer to corresponding parts throughout the different views of the drawings.

Figures 1, 6, 7:
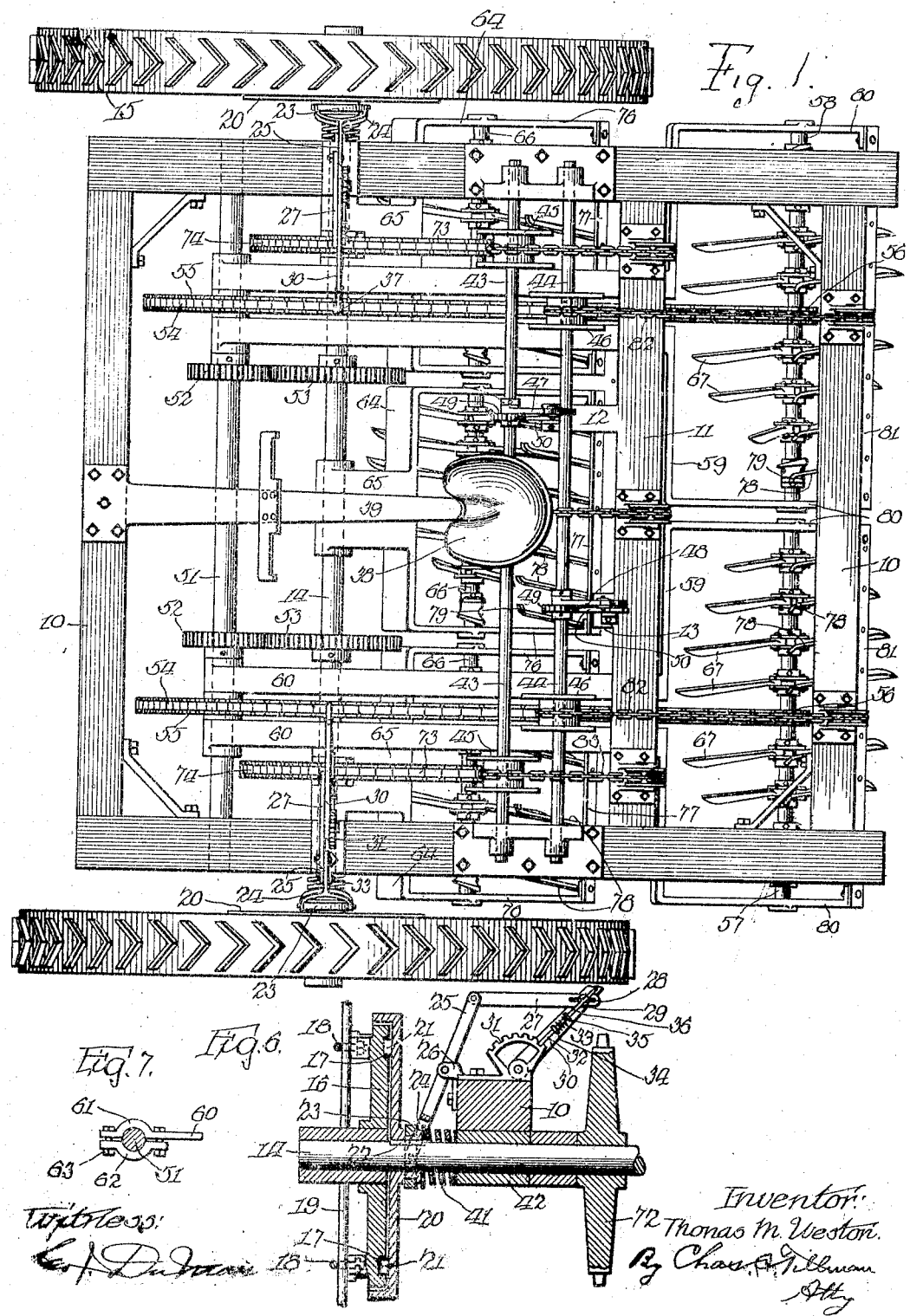
Figure 1 is a plan view of the complete machine showing its parts in the operative positions.
Fig. 6 is an enlarged vertical sectional view of one of the clutch mechanisms employed for throwing the machine into and out of operative position.
Fig. 7 is a detailed view of a portion of the front part of one of the frames or carriers for the cutters or pulverizing members showing a means for detachably mounting it on its supporting shaft.

Referring now to Figs. 1, 2 and 6 of the drawings, the reference numeral 10 designates the main or supporting frame of the machine, which frame is rectangular in shape and may be made of any suitable size and material. This frame has near its rear end a cross bar 11, which is provided between its ends with forward extensions 12 and 13, which are spaced apart as shown and are for the support of pawls used for engaging ratchet wheels of the raising and lowering mechanisms for the cutters and pulverizing members. The frame 10 is supported near its front end by means of a driving shaft or axle 14, on each end of which is mounted a traction wheel 15, each of which has surrounding the inner portion of its hub a disk 16, having near its periphery on its inner surface notches 17 arranged in a circular row. The disks 16 are secured by means of clips 18 to the spokes 19 of the wheels in such a manner that said disks will rotate with the wheels. Mounted on the axle or shaft 14 inwardly of each of the disks 16 is another disk 20, each of which has on its surface adjacent the disk 16 a series of projections 21 arranged in a circular row to register with and engage the notches 17 of the first named disk. Each of the disks or clutches 20 is slidably mounted on the shaft 14 by means of a key 22, which will permit them to slide on the shaft, but will cause them to turn therewith. Loosely surrounding the inner portion of the hub of each of the disks 20 is a collar 23, to which is pivotally secured the ends of a yoke 24, which strides said collar and has an upwardly extended arm 25, each of which is fulcrumed on a bracket 26, mounted on the side rails of the main frame. The upper end of each of the arms 25 has pivotally connected thereto a link 27, each of which has at its opposite end a longitudinal slot 28 through which is extended a pin 29 carried by a lever 30 one of which is fulcrumed on the main frame 10 near each of the brackets 26 and alongside a segmental rack 31, with each of which a dog 32, carried by each of the levers 30 engages. Each of the dogs 32 is actuated by a spring 33 surrounding the same and resting at one end against a collar 34 on the dog and at its other end against an apertured projection 35 on the lever 30, through which aperture a rod 36 is extended upwardly along the lever to near its upper end, where it is pivotally connected to a grip member 37, which is pivoted to the lever 30 near its upper end. Each of these levers extend upwardly a sufficient distance to be readily reached by the operator, who may occupy a seat 38, mounted on spring supports 39 and 40 extended upwardly and rearwardly from the front portion of the frame 10, to which part of the frame a traction engine, a team of horses or other motive or propelling power may be connected in any suitable manner. By moving the levers upwardly from the positions shown in Figs. 1 and 6 of the drawings, it is manifest that the clutch members 20 will be thrown out of engagement with the clutch members or disks 16, in which positions they will be held by reason of the dogs or plungers 32 engaging the racks 31. When so positioned it is obvious that the mechanism of the machine will be thrown out of gear and that the apparatus may be transported from one point to another until it is desired to throw the mechanism into gear, when, by pressing the grips 37 toward the levers 30, the dogs or plungers 32 will be disengaged from the racks 31, in which operation springs 41 surrounding the axle or shaft 14, between the disks 20 and the bearings 42 of said shaft, will cause the disks or clutch members 20 to engage the members 16, thus throwing the mechanism into gear. Transversely mounted on the frame 10 near its middle are a pair of parallel shafts 43 and 44, the former of which has rigidly mounted thereon a plurality of pulleys 45, there being three of such pulleys in the present instance, one of which is located directly beneath the seat 38. The shaft 44 has rigidly mounted thereon a plurality of pulleys 46, two in the present instance. Mounted on each of the shafts 43 and 44 near enough to the seat 38 to be readily reached by the operator is a raising and lowering lever for the primary and secondary cutters, which levers are indicated by the numerals 47 and 48 respectively. Each of these levers is loosely mounted on its respective shaft and is held against slidable movement in one direction thereon by means of a collar 48ª, fixed to its shaft. On the opposite side of each of said levers is fixed to its shaft a ratchet wheel 49, which is controlled in one direction by a pawl 50, one of which is mounted on each of the extensions 12 and 13 of the cross bar 11 of the main frame. The levers 47 and 48 are equipped with dogs or plungers 32, springs 33, rods 36, grips 37, of a similar construction and like operation to that shown in Fig. 6, and above described.

Journaled transversely on the main frame 10 in front of the driving shaft or axle 14 and in parallelism therewith is a jack shaft 51, which has mounted thereon a plurality of pinions 52, which engage gears of a larger diameter 53, mounted on the driving shaft or axle 14 inwardly of the sides of the main frame. Mounted on the shaft 51 between the pinion 52 and the side walls of the main frame is a sprocket wheel 54 over each of which is extended an endless sprocket chain 55, which chains also pass over sprocket wheels 56 mounted on shafts 57 and 58, transversely journaled on carriers or frames 59 on said shafts. Each of these frames or carriers is substantially rectangular in shape and have a pair of forwardly extended bars 60, which are upwardly curved near their front ends so as to overlie the shaft 14 and so that they may be loosely and detachably fixed at their front ends to the jack shaft 51. To perform this the front end of each of the bars 60 is provided with a separable bearing consisting of an upwardly curved portion 61 integral with the bar, and a downwardly curved member 62, which is fastened to the bar by means of bolts 63 and nuts.

Mounted on the driving shaft or axle 14 are a plurality of rectangular frames 64, each of which has a forwardly extended projection 65, which are loosely connected at their front ends to the driving shaft 14 in the same manner and by similar means as the arms 60 to the shaft 51. As shown in Figs. 1 and 2 of the drawings, the frames 64 are located side by side and extended downwardly, and each of said frames has transversely journaled thereon a shaft 66, which shafts are mounted in alinement with one another and constitute the sectional primary cutter carrying shaft. Mounted on each of the sections 66 of the primary cutter shaft are a plurality of cutters 67 which are in the form of the blades of a motor boat or aircraft; that is, said blades or cutters are slightly pitched at an angle to the shaft on which they are mounted, or have a helical curve or twist from the shaft outwardly. These blades or cutters are secured to the shafts 66 by means of a pair of plates 68, one of which is located on each side of the cutter, and said plates are secured thereto by means of rivets 69 or otherwise. The plates 68 are keyed to the shaft on which they are mounted and are further held in position thereon by means of collars 70, one of which is located against each of said plates, and said collars may be held in position on the shaft 66 by means of set screws 71, as is clearly shown in Figs. 3 and 4 of the drawings. The cutters 67 of the primary cutting shaft are located at angles to one another, as is clearly shown in Fig. 2 of the drawings, and are spaced at suitable distances apart. On each of the sections 66 is mounted a sprocket wheel 72, over each of which a sprocket chain 73 is passed, which also pass around sprocket wheels 74 mounted on the drive shaft at proper places in front of the sprocket wheels 72 on the primary cutter shaft. The shafts 57 and 58 constitute the secondary cutter shaft, which have mounted thereon cutters 67 of the same construction as the cutters 67 on the primary cutter shaft above described, and the same are secured in position on the sections 57 and 58 in a like manner. However, the pitch of the cutters 67 on the secondary cutter shafts or sections are pitched in the opposite direction from the cutters on the primary cutter shaft. The cutters of the primary shaft, as well as the secondary shaft have their front edges knifelike and their ends or portions which strike the ground first in the rotary movement thereof pointed as at 75 (see Figs. 2, 3 and 4 of the drawings). Each of the frames 64 has on the lower end of each of its sides an upwardly and rearwardly extended arm 76, which are connected at their upper ends by means of cross bars 77, each of which bars has mounted thereon a series of spring cleaners 78, which are located between the cutters 67 and in such positions as to contact therewith in the revolution of said cutters at points near the shafts on which they are mounted. Each of the cleaners 78 has its free end provided with a lip or curved portion 79 to deflect them from the cutters, or so as to prevent the cutters striking their free ends abruptly or abutting against the same. Each of the frames 59 has at the lower end of each of its sides an upwardly extended arm 80, which are united at their upper ends by cross bars 81, which bars are equipped with spring cleaners 78 of the same construction as the cleaners 78 used in connection with the primary cutters and above described. The cleaners 78 on the frames of the primary cutters act against the surfaces of the cutters 67 in such a way as to remove clay and sticky earth therefrom, and the cleaners 78 of the secondary cutters act against the surfaces of the said cutters to remove grass roots, weeds and other accumulations therefrom. Connected at one of their ends to each of the cross bars 81 of each of the frames 59 is a chain 82, each of which is connected at its front end to the pulleys 46 on the shaft 44, which shaft can be operated by the lever 48 in such a manner as to wind the chains 82 on the pulleys 46, thus elevating the frames 59 and the cutter shafts or sections 57 and 58 which they carry.

Connected at one of their ends to each of the cross bars 77 of the primary cutter frames is a chain 83, each of which passes over a pulley 84 and has its front end connected to one of the pulleys 45 on the shaft 43, which shaft can be operated in the proper manner by means of the lever 47 and its connections with said shaft to cause the chains 83 to be wound on the pulleys 45 and thus elevate the frames 64 and the sectional shafts of the primary cutter shaft to the desired position. The pulleys 84 are mounted on suitable brackets 85 on the upper surface of the cross bar 11 of the main frame, and pulleys 86, over which the chains 82 pass, are likewise mounted on the upper surface of the rear portion of the main frame. It will be understood by reference to Fig. 2 of the drawings and from the foregoing description that the cutters 67 on the primary and secondary cutter shafts will be rotated in opposite directions by reason of the gearing which unites said shafts to the axle or driving shaft 14 of the machine. It will be further understood that by reason of the arrangement of the gearing for said shafts the primary cutter shaft will be rotated at a higher speed than that of the driving shaft, and that the secondary cutter shafts or sections will be rotated at a higher speed than the primary cutter shaft.

The operation of the machine is simple and as follows: Assuming that the clutch members 20 are in engagement with the clutch members or disks 16 of the traction wheels, and that the machine is located in a field in position to begin operation, it is manifest that by driving the machine forwardly, which as before stated can be done by means of any suitable motive power, the cutter shafts can be lowered through the instrumentality of the levers 47 and 48, and the mechanism connecting them to the frames of the rotary shafts, so that the cutters 67 may enter the soil or ground to the desired depth, when the primary cutters will cut in a spade-like operation the soil and throw it to one side of the cutters, while the secondary cutters will recut and thoroughly pulverize the soil, in which operation the secondary cutters will carry up grass roots, weeds and the like, which will be removed from the cutters by means of the cleaners 78 and cause them to fall and lie on the ground so that they will be killed by exposure.

When it is desired to use the machine as a cultivator the secondary cutters can be raised or, if desired, their frames can be detached from the jack shaft and removed from the machine when, by removing the alternate sections of the primary cutter shaft, when there are more than three of such sections, or the middle one when there are only three, it is obvious that the remaining sections of the primary cutter shaft will cultivate the soil between the rows of the plants or crops, which will be disposed, one of them in the space from which the middle section has been removed, while other rows will be located on the outside of the remaining sections.

By my improvement it is apparent that I furnish a machine which will perform the work of three old-style machines, that is, it will break up and finish the soil as it goes along in one operation, thus leaving it in condition for seed, more thoroughly stirred and pulverized and to a greater depth than has heretofore been done. I also furnish in the same machine a cultivator for hoed crops, such as corn, cotton and other crops that are planted in rows. Furthermore, by my improvements I lift the work from the ground and place it on wheels, thereby getting a great advantage over the resistance of the ground by the use of the leverage of the cutters and their speed.

Having thus fully described my invention what I claim as new and desire to secure by Letters Patent is—

1. In a machine of the class described, the combination with a main frame, of a drive shaft journaled thereon, traction wheels on said shaft, and a cutter carrying shaft consisting of a plurality of alined sections independently mounted on the machine and geared to the drive shaft for transmitting rotary motion to the cutter shaft from said wheels, the alternate sections of the cutter shaft being detachably mounted on the machine.

2. In a machine of the class described, the combination with a main frame, of a drive shaft journaled thereon, traction wheels on said shaft, a plurality of frames movably mounted side by side on said shaft and extended downwardly therefrom, a cutter carrying shaft consisting of sections rotatably mounted on said frames and independently geared to the drive shaft for transmitting rotary motion to said sections from said wheels, the alternate sections being detachably mounted on the machine, and means to raise and lower the said frames.

3. In a machine of the class described, the combination with a main frame, of a drive shaft journaled thereon, traction wheels on said shaft, a jack shaft journaled on the main frame and geared to the drive shaft, a frame movably mounted on the drive shaft and extended downwardly therefrom, a primary cutter carrying shaft transversely journaled on the last named frame, means to raise and lower said frame and the shaft thereon, a frame movably mounted on the jack shaft and extended rearwardly of the primary cutter carrying shaft frame, a secondary cutter carrying shaft transversely journaled on said rearwardly extended frame, means to raise and lower the last named frame and the shaft thereon, gearing uniting the primary cutter carrying shaft to the drive shaft, and gearing uniting the secondary cutter carrying shaft to the jack shaft.

4. In a machine of the class described, the combination with a main frame, of a drive shaft journaled thereon, traction wheels on said shaft, a jack shaft journaled on the main frame and geared to the drive shaft, a frame movably mounted on the drive shaft and extended downwardly therefrom, a primary cutter carrying shaft transversely journaled on the last named frame, means to raise and lower said frame and the shaft thereon, a frame movably mounted on the jack shaft and extended rearwardly of the primary cutter carrying shaft frame, a secondary cutter carrying shaft transversely journaled on said rearwardly extended frame, means to raise and lower the last named frame and the shaft thereon, gearing uniting the primary cutter carrying shaft to the drive shaft and arranged to impart rotary movement to the primary cutter shaft at a higher speed than the drive shaft, and gearing uniting the secondary cutter carrying shaft to the jack shaft and arranged to impart rotary movement to the secondary cutter shaft at a higher speed than said primary shaft and in the opposite direction.

5. In a machine of the class described, the combination with a main frame, of a drive shaft journaled thereon, traction wheels on said shaft, a jack shaft journaled on the main frame and geared to the drive shaft, a frame movably mounted on the drive shaft and extended downwardly therefrom, a primary cutter carrying shaft transversely journaled on the last named frame, means to raise and lower said frame and the shaft thereon, a frame movably mounted on the jack shaft and extended rearwardly of the primary cutter carrying shaft frame, a secondary cutter carrying shaft transversely journaled on said rearwardly extended frame, means to raise and lower the last named frame and the shaft thereon, gearing uniting the primary cutter carrying shaft to the drive shaft and arranged to impart rotary movement to the primary cutter shaft at a higher speed than the drive shaft, and gearing uniting the secondary cutter carrying shaft to the jack shaft.

6. In a machine of the class described, the combination with a main frame, of a drive shaft journaled thereon, traction wheels on said shaft, a jack shaft journaled on the frame and geared to the drive shaft, a primary cutter carrying shaft consisting of a plurality of alined sections independently mounted on the drive shaft, gearing uniting said sections to the drive shaft, at least one of said sections being detachably mounted on said shaft, a secondary cutter carrying shaft consisting of a plurality of alined sections independently mounted on the jack shaft and located at the rear of said primary shaft, gearing uniting said sections and the jack shaft, and means to raise and lower said shafts.

7. In a machine of the class described, the combination with a main frame, of a drive shaft journaled thereon, traction wheels on said shaft, a jack shaft journaled on the frame and geared to the drive shaft, a primary cutter carrying shaft consisting of a plurality of alined sections independently mounted on the drive shaft, gearing uniting said sections to the drive shaft and arranged to impart rotary movement to the primary cutter shaft at a higher speed than the drive shaft, at least one of said sections being detachably mounted on said shaft, a secondary cutter carrying shaft consisting of a plurality of alined sections independently mounted on the jack shaft and located at the rear of said primary shaft, gearing uniting said sections and the jack shaft and arranged to impart rotary movement to the secondary cutter shaft at a higher speed than the primary shaft, and means to raise and lower said shafts.

8. In a machine of the class described, the combination with a main frame, of a drive shaft journaled thereon, traction wheels on said shaft, a jack shaft journaled on the frame and geared to the drive shaft, and a frame movably mounted on the drive shaft and extended downwardly therefrom and having a cross bar supported thereon above its rear or lower portion, a primary cutter carrying shaft transversely journaled on the last named frame, means to raise and lower said frame and the shaft thereon, a frame movably mounted on the jack shaft and extended rearwardly of the primary cutter carrying shaft frame and having a transverse bar supported thereon above its rear or lower end, a secondary cutter carrying shaft transversely journaled on said rearwardly extended frame, means to raise and lower the last named frame and the shaft thereon, spring cleaners carried by the last named cross bar and co-acting with the secondary cutters to clean the same, gearing uniting the primary cutter carrying shaft to the drive shaft, and gearing uniting the secondary cutter carrying shaft to the jack shaft.

9. In a machine of the class described, the combination with a main frame, of a drive shaft journaled thereon, traction wheels on said shaft, a jack shaft journaled on the main frame and geared to the drive shaft, a plurality of frames mounted on the drive shaft and extended downwardly therefrom, each of said frames having at its lower or rear end a cross bar supported thereon and above the same, a primary cutter carrying shaft consisting of a plurality of sections rotatably mounted on said frames and independently geared to the drive shaft, at least one of said sections being detachably mounted on the machine, spring cleaners extended from said cross bar and co-acting with the said cutters to clean the same, a plurality of frames mounted on the jack shaft and extended rearwardly of the primary cutter carrying shaft frames, a secondary cutter carrying shaft consisting of sections transversely journaled on said rearwardly extended frames, means to raise and lower the last named frames and the shafts thereon, gearing uniting the secondary cutter carrying shaft sections to the jack shaft, and spring cleaners mounted on the frames for the secondary cutter shaft sections co-acting with the said cutters to clean the same.

In witness whereof, I have hereunto subscribed my name this 9th day of Jany. 1919, at Chicago, Cook county, Illinois.

THOMAS M. WESTON.

Witnesses:
 CHAS. C. TILLMAN,
 E. R. TILLMAN.